UNITED STATES PATENT OFFICE.

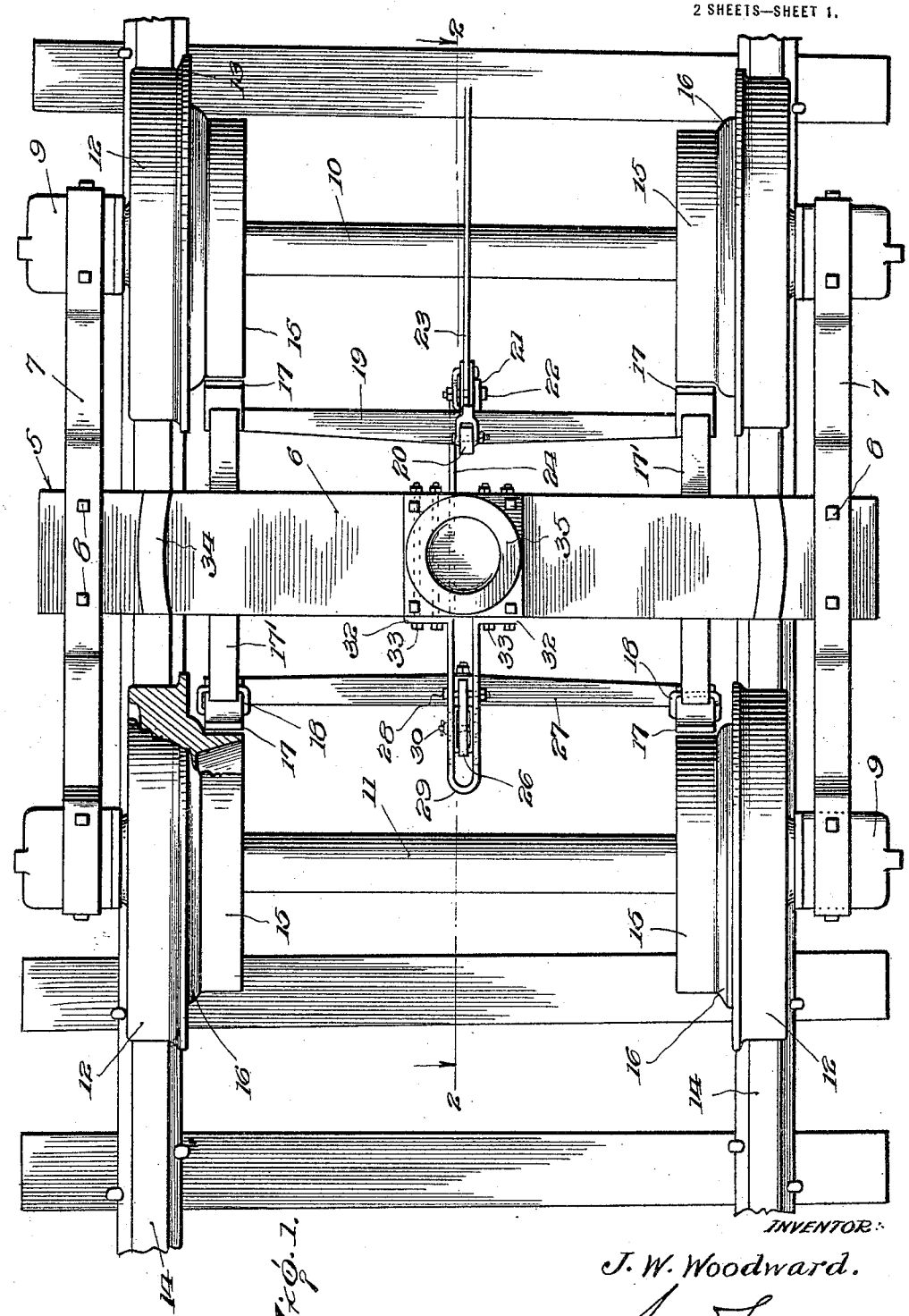

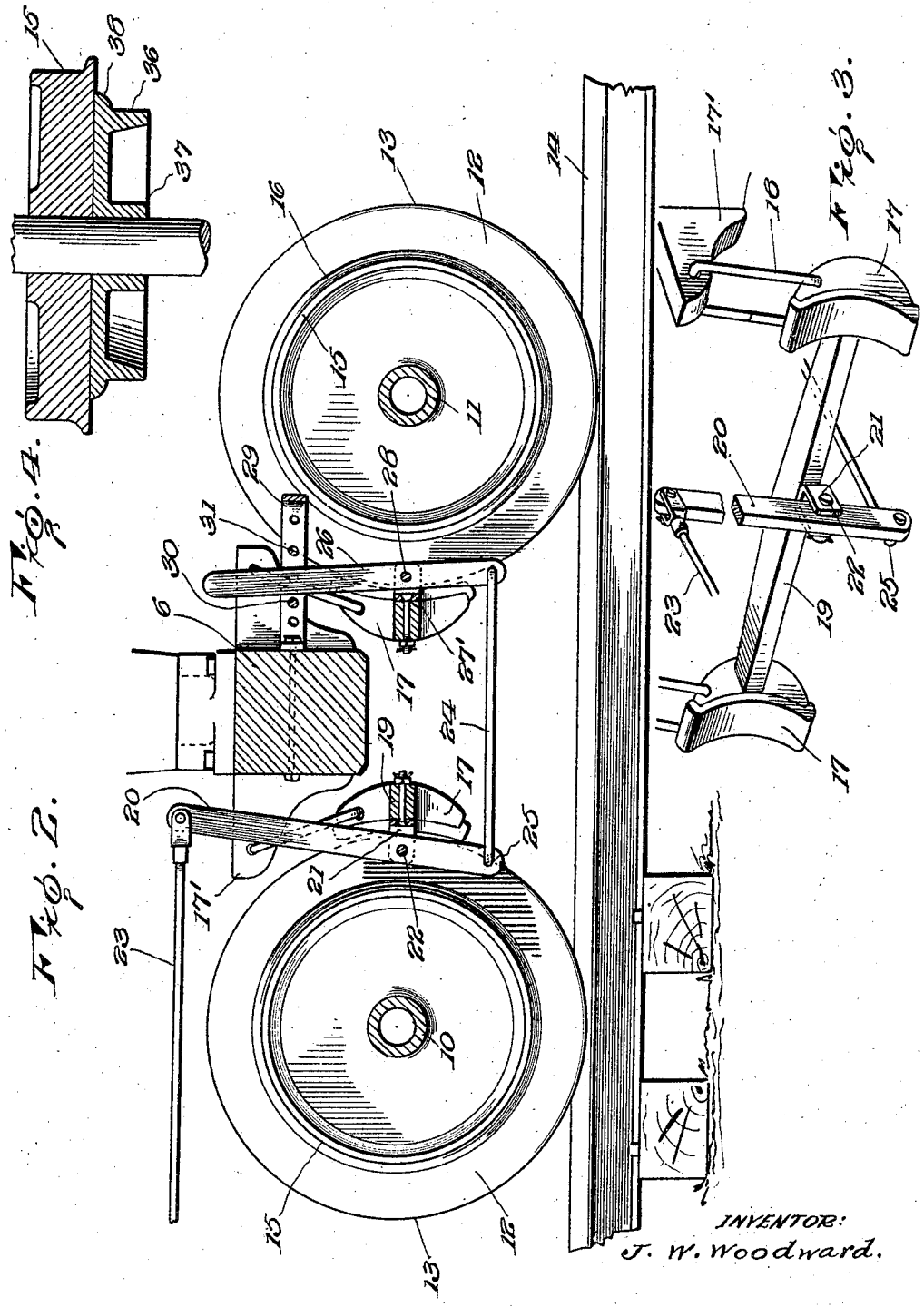

JESSE W. WOODWARD, OF CLARKS, LOUISIANA.

BRAKE DRUM FOR CAR TRUCKS.

1,402,825.                    Specification of Letters Patent.    Patented Jan. 10, 1922.

Application filed October 4, 1919. Serial No. 328,356.

*To all whom it may concern:*

Be it known that I, JESSE W. WOODWARD, a citizen of the United States, residing at Clarks, in the parish of Caldwell and State of Louisiana, have invented certain new and useful Improvements in Brake Drums for Car Trucks, of which the following is a specification.

This invention relates to improvements in braking apparatuses especially adapted for use on railway rolling stock.

An important object of this invention is to provide a railway braking apparatus which is arranged inwardly of the rails whereby in the event that the braking apparatus becomes loosened or detached during use, the same will not fall upon the rails and derail the car.

A further object of this invention is to provide a braking apparatus wherein the drums of the same are rigidly connected to and arranged inwardly of the wheels and are adapted to be engaged by braking shoes, thereby eliminating frictional contact between the braking shoes and the wheels.

A further object of the invention is to provide a braking apparatus of the character described which is safe, efficient in use, and simple to operate.

Further objects and advantages of the invention will be apparent during the course of the following description.

In the accompanying drawings forming a part of this application and in which like numerals are employed to designate like parts throughout the same, Figure 1 is a plan view of a car truck having the improved braking apparatus applied, Figure 2 is a vertical longitudinal section taken on line 2—2 of Fig. 1, Figure 3 is a fragmentary perspective of the braking apparatus, Figure 4 is a detail horizontal section through a slightly modified form of the invention.

In the drawings wherein for the purpose of illustration is shown a preferred embodiment of the invention, the numeral 5 generally designates a car truck upon which is adapted to be mounted the body of a car which may be of either freight or passenger type. The truck 5 includes a transversely extending bolster 6 having leaf springs 7 secured to its ends by bolts 8. As best illustrated in Figure 1, the end portions of the springs 7 are secured to journal boxes 9 which rotatably support transversely extending axles 10 and 11. Supporting wheels 12 are pressed on or otherwise rigidly secured to the axles 10 and 11 and have their flanges 13 arranged on the inner sides of rails 14. In the form of the invention illustrated in Figure 1, a braking drum 15 is cast integral with each wheel 12 and is of a lesser diameter than the same. With the reference to Figure 2, it will be noted that the drum 15 is provided on its outer side with an inclined annular flange 16 which serves to strengthen the connection between the drum and the wheel and also serves to limit the outward movement of the adjacent brake shoe 17.

The improved braking mechanism includes a plurality of brackets 17′ secured to the opposite sides of the bolster and pivotally supporting a plurality of rectangular hangers 18. The hangers 18 pivotally support the brake shoes 17 and permit the same to be drawn into frictional contact with the brake drums 15. A brake beam 19 serves to connect one pair of shoes 17 and has connection with a lever 20 through the medium of a pair of spaced apertured ears 21. As illustrated in Figure 3 a pivot bolt 22 is extended through the ears 21 and serves to pivotally support the lever 20 intermediate its ends. An operating rod 23 is connected to the upper end of the lever 20 and has connection with the usual brake operating mechanism. By a longitudinal movement of the rod 23 the lever 20 is operated for bringing the shoes 17 into frictional contact with the drums 15. A connecting link 24 is pivotally connected to the lower end of the lever 20 as indicated at 25 and has its opposite end pivotally connected to a second lever 26. A second brake beam 27 is pivotally connected intermediate its ends to the intermediate portion of the lever 26 through the medium of a second pair of apertured ears 27′ and a pivot bolt 28.

With reference to Figure 2, it will be noted that the upper portion of the lever 26 passes through a U-shaped yoke 29 and is secured in an adjusted position within the same by a retaining pin 30. The retaining pin 30 may be passed through any one of a plurality of openings 31 in the yoke for varying the degree of frictional contact between the brake shoes and the drums. As best illustrated in Figure 1, the yoke 29 is rigidly attached to the bolster 6 by a pair of attaching feet 32 which receive bolts 33 extended through the bolster.

The upper side of the bolster 6 is provided with outer and central bearings 34 and 35 respectively upon which is adapted to be mounted the body of the car.

In the form of my invention illustrated in Figure 4, a drum 36 is provided with a cupped hub 37 adapted to be pressed upon the axle and arranged inwardly of the wheel 15. In this form of the invention, the drum 36 is made separately from the wheel and is provided with an annular bracing flange 38 which is arranged in contact with the inner surface of the wheel. In both forms of the invention, the brake drum is provided with an annular shoe engaging rim, the inner side of which is hollow for dissipating the heat generated by the frictional contact between the shoe and the drum.

In the use of the improved braking apparatus, the brake drum and the beams are arranged inwardly of the rails so that in the event of the shoes 17 or brake beams becoming detached, they will not fall upon the rails and result in the derailing and probable wrecking of the train. In providing a separate braking surface for the wheels, all frictional contact between the wheels and the brake shoes is eliminated, whereby the life of the wheels is greatly prolonged. The brake drums 15 do, however, have positive connection with the wheels and serve to retard the same upon being engaged with the brake shoes 17.

It is to be understood that the form of the invention herewith shown and described is to be taken as the preferred example of the same and that such minor changes in arrangement and construction of parts may be made as will remain within the spirit of the invention and the scope of what is claimed.

Having thus described this invention what is claimed is:

1. The combination with a truck having axles and wheels mounted upon the axles, of brackets carried by the truck and overhanging said wheels, hangers pivotally carried by said brackets, pairs of brake shoes supported by said hangers, brake beams connecting the brake shoes of each pair, upstanding levers pivoted intermediate their ends to the intermediate portions of said brake beams, an operating member connected to one lever, a link extending longitudinally of the truck and connecting the lower ends of said levers, and drums carried on the inner faces of said wheels and engaged by said shoes, each drum having an annular reinforcing flange abutting the wall and spacing the shoe from the wheel.

2. In a car truck the combination of a wheel, and an annular drum formed integral with said wheel and extending inwardly from the same, said drum being of a lesser diameter than the diameter of said wheel and being provided with an annular reinforcing flange abutting the wheel and constituting a means for spacing the brake shoe engaged with the drum from said wheel.

In testimony whereof I affix my signature.

JESSE W. WOODWARD. [L. S.]